United States Patent [19]

Miga

[11] 4,048,138

[45] Sept. 13, 1977

[54] STABILIZATION OF TALC-FILLED POLYSTYRENE

[75] Inventor: Christian John Miga, Littleton, Colo.

[73] Assignee: Johns-Manville Corporation, Denver, Colo.

[21] Appl. No.: 706,878

[22] Filed: July 19, 1976

[51] Int. Cl.$^2$ .............................................. C08K 3/34
[52] U.S. Cl. .............................. 260/42.37; 260/42.45; 260/873
[58] Field of Search ................... 260/42.37, 42.45, 873

[56] References Cited

U.S. PATENT DOCUMENTS

| | | | |
|---|---|---|---|
| 3,553,158 | 1/1971 | Gilfillan | 260/42.45 |
| 3,799,906 | 3/1974 | Kietzman | 260/42.45 |

*Primary Examiner*—Sandra M. Person
*Attorney, Agent, or Firm*—Robert M. Krone; Joseph J. Kelly; James W. McClain

[57] ABSTRACT

A talc-filled polystyrene composition which is stabilized against short-term color degradation is described. The composition comprises polystyrene, talc, and a polyester-forming mixture of a polybasic organic acid or anhydride, preferably trimellitic anhydride, and a polyhydric alcohol, preferably a polyethylene glycol.

12 Claims, No Drawings

STABILIZATION OF TALC-FILLED POLYSTYRENE

BACKGROUND OF THE INVENTION

1. Field of the Invention

The invention herein relates to the stabilization of talc-filled polystyrene. More particularly, it relates to a method for reducing the short term color degradation of polystyrene caused by incorporation of talc into the polystyrene.

It is common practice to use small amounts (20% or less) of talc as a filler in polystyrene compositions. The polystyrene and talc are milled together (i.e., compounded) until the talc is thoroughly dispersed through the polystyrene. Also present in the polystyrene are certain chemical stabilizers, such as di-tert.-butyl-p-cresol ("DBPC"; also known as butylated hydroxy-toluene or "BHT"). The work of milling the talc and polystyrene causes shearing in the resin and an increase in the resin temperature. These serve to enhance the catalytic effect of the talc and the net result is a tendency to color degradation of the polystyrene. However, in normal practice, the presence of the stabilizer is sufficient to neutralize the catalytic effect of the small amounts of talc filler. It is desirable in many instances, however, to have a talc filler content considerably in excess of 20%. Talc filer contents of 30 to 50% are desirable for many products, and the filler content may even be as high as 70% when a polystyrene/talc concentrate is formed for later master batching. With these high talc contents (i.e., greater than 20%) the normal amounts of stabilizers are ineffective to prevent the color degradation caused by the talc. Addition of more stabilizer would be impractical in terms of cost and also because of deleterious effects which might be caused by the excessive amounts of conventional stabilizers.

It would therefore be desirable to have a way of stabilizing polystyrene such that the polystyrene could tolerate large talc filler contents without significant short term color degradation during milling.

2. Description of the Prior Art

It has been known in the past that talc has a deleterious effect on polyolefins; see U.K. Pat. No. 1,219,783. This reference shows the use of a polyhydric alcohol (such as pentaerythritol) to overcome the degrading effects of talc or asbestos in a polyolefin. U.S. Pat. No. 3,799,906 shows the degrading effect of asbestos on polypropylene and teaches the use of polyester forming reactants including an organic acid or anhydride and a polyhydric alcohol mixed with the asbestos and polypropylene at an elevated temperature to provide a heat-stabilized, asbestos-filled polypropylene composition. U.S. Pat. No. 3,553,158 describes the degrading effect of talc on polyolefins and teaches the use of "talc deactivators", including aliphatic polyols as stabilizers. Several other references related to polyolefin degradation are cited in the aforementioned U.S. Pat. No. 3,799,906.

BRIEF SUMMARY OF THE INVENTION

The invention herein comprises a talc-filled polystyrene composition stabilized against short term color degradation which occurs during the compounding of the polystyrene and talc, which composition comprises, in parts by weight: 25 to 80 parts of polystyrene; 20 to 75 parts of talc; and 0.5 to 5 parts of a mixture of polyester forming reactants comprising a polybasic organic acid or anhydride and a polyhydric alcohol, each having a melting point in a range of 250° to 550° F (121° to 288° C), the organic acid or anhydride and the alcohol each being present in a mixture of reactants in an amount of from 1 to 2 parts by weight per 3 parts by weight of mixture of reactants. In a preferred embodiment, the acid or anhydride component of the reactant mixture and the alcohol component of the reactant mixture are present in approximately equal amounts by weight. In another embodiment of the invention, the color stabilized composition is one in which the polystyrene, talc and polyester forming reactant mixture are compounded by mixing for at least 3 minutes at a temperature of at least 400° F (204° C).

DETAILED DESCRIPTION OF THE INVENTION

The invention herein comprises a color stabilized talc-filled polystyrene. The polystyrene of the present composition may be any conventional polystyrene resin. Such resins are well known and need not be further described here. It will be recognized by those skilled in the art that some commercial polystyrene resins contain conventional stabilizing additives, extrusion lubricants or other types of special purpose additives. In the invention herein, such additives may be disregarded unless their chemical nature or concentration in the polystyrene is such as to adversely effect the talc, acid or anhydride or alcohol. Those skilled in the art will be well aware of which polystyrene additives may have this adverse effect on any of the components of the present invention and can readily select a commercial polystyrene resin which does not contain such additives.

In the present invention the polystyrene will be present as from 25 to 80 parts by weight, preferably 50 to 80 parts by weight of the final composition. In those instances where an intermediate master batch is prepared, however, the preferred amount of polystyrene will be from 25 to 50 parts by weight.

The talc for the present invention may be any conventional talc. Talc is a soft magnesium silicate mineral widely found in extensive deposits. For use as a polystyrene filler, talc will normally be subdivided to particle sizes of minus 200 mesh (74 $\mu$m) and preferably particle sizes of minus 325 mesh (44 $\mu$m). A series of talcs commercially available from the Johns-Manville Corporation are particularly satisfactory in the present invention. Talcs from different deposits will contain varying amounts of different impurities. Normally the talc refinement process will remove a significant portion of these impurities. The amount and type of impurities remaining in the talc to be used in this invention are not critical, except that neither the type nor amount should be such as to adversely affect the polystyrene, acid or alcohol. Also, where the final filled polystyrene product is to be used for food or beverage contact, the impurities must not be detrimental to health. Those skilled in the art will be readily able to select an appropriate talc which meets any desired specification for type and amount of impurities.

In the present invention the talc will be present as from 20 to 75 parts by weight, and preferably 20 to 50 parts by weight in finished compositions. However, when a master batch concentrate is to be made, the preferred talc concentration will be 50 to 75 parts by weight.

The organic polybasic acids or anhydride and the polyhydric alcohols which make up the polyester forming reactant mixture will have relatively low vapor pressures at polystyrene working temperatures (about 400° to 500° F or 204° to 260° C) so that they are not lost in the mixture during compounding. They should also have melting points of 250° to 550° F (121° to 288° C). Typical organic polybasic acids or anhydrides which may be used in the present invention include the various phthalic and terephthalic acids and anhydrides having the requisite melting point and volatility characteristics and trimellitic anhydride, which is the preferred material. The various polyhydric alcohols which may be used in the present invention include pentaerythritol and dipentaerythritol, hexahydric alcohols such as mannitol and sorbitol and the higher melting forms of polyethylene glycols. Particularly suitable compositions have been made from high molecular weight polyethylene glycols commercially available under the trademark "Carbowax". In those instances where the final polystyrene products are to be used in conjunction with edible foods (such as plastic drinking cups), the particular acid or anhydride and alcohol should be selected to be ones which are approved by the appropriate governmental health agencies for food contact. For such products, trimellitic anhydride and polyethylene glycol are the preferred reactants.

In the present invention the mixture of polyester forming reactants will total from 0.5 to 5 parts by weight of the total composition. Satisfactory results have been obtained with mixture concentrations of both 1 and 2% total of mixture in the total composition. The ratios of acid or anhydride and alcohol will be in the range of from 1 to 2 parts of each component for each 3 parts of mixture. Preferably, the acid or anhydride and the alcohol will be present in approximately equal amounts (a 1:1 ratio).

If desired, conventional additives may also be present in the overall composition. These may include materials such as ultraviolet stabilizers, extrusion or molding aids and the like. These will be present in small conventional quantities. It will be understood that these additives must be selected so as not to have any significant adverse effect on the stabilizing mixture of the present invention.

The materials of the color stabilized mixture of the present invention can be compounded in any suitable manner. Normally conventional mixing equipment such as a mill or a Banbury mixer is used. Mixing is normally accomplished in a period of from 1 to 30 minutes, usually about 5 to 10 minutes. The acid or anhydride and the alcohol should be added as separate components; their stabilizing effect has been found to be very limited when they are prereacted prior to being compounded with the polystyrene and talc. Mixing is normally continued until a temperature of aproximately 400° to 500° F (204° to 260° C) is obtained and a homogeneous composition in which the talc and the polyester forming materials are thoroughly dispersed in the polystyrene is formed.

The following examples will illustrate the present invention. In each case a conventional polystyrene resin formulation was used, and was filled with a commercial talc sold by the Johns-Manville Corporation under the trademark "DESERTALC-57". This is a California talc having a maximum particle size of 20 μm and an average particle size of approximately 3 μm, and being composed of approximately 85% magnesium silicate, the rest of the composition being minor metal oxide impurities and water. In these examples there were present 3 parts by weight of polystyrene and 2 parts by weight of talc (40% by weight talc). In each of the examples below a different test additive was added in the amount shown. Each of the materials was then milled in a "Brabender Plasti-Corder" mill for 5 minutes at 460° F (238° C) and then compressed into thin sheets using a hot press. Each sample was then observed for degradation of the original milky white color which would be normal color of a polystyrene/talc mixture if there were no talc catalyzed degradation of the polystyrene.

TABLE

| Additive (a) | Ratio | Concentration Parts by Weight | Resulting Color | Degradation |
|---|---|---|---|---|
| DBPC | — | 0.25 (b) | brown | yes |
| DBPC | — | 1.0 (b) | brown | yes |
| TMA | — | 3.0 (c) | brown | yes |
| TMA | — | 5.0 (c) | brown | yes |
| TMA/DPE | 1:1 | 1.0 (d) | white | no |
| TMA/PEG | 1:1 | 2.0 (d) | white | no |

Notes:
(a) DBPC = di-tert.-butyl-p-cresol
TMA = trimellitic anhydride
DPE = dipentaerylthritol
PEG = polyethylene glycol, molecular weight of about 6000
(b) Based on resin content
(c) Based on talc content
(d) Based on total resin and talc content

What I claim is:

1. A polystyrene composition filled with at least 20% by weight of talc and stabilized against short-term color degradation, which comprises, in parts by weight:

| polystyrene | 25 to 80 parts |
|---|---|
| talc | 20 to 75 parts | and 0.5 to 5 parts of a mixture of polyester forming reactants comprising a polybasic organic acid or anhydride and a polyhydric alcohol, each having a melting point in the range of 250° to 550° F, said organic acid or anhydride and said alcohol each being present in said mixture in an amount of from 1 to 2 parts by weight per 3 parts by weight of said mixture.

2. A composition as in claim 1 wherein said organic acid or anhydride and said alcohol are present in approximately equal parts by weight in said mixture.

3. A composition as in claim 1 wherein said polystyrene is present as 50 to 80 parts by weight and said talc is present as 20 to 50 parts by weight.

4. A composition as in claim 1 wherein said polystyrene is present as 25 to 50 parts by weight and said talc is present as 50 to 75 parts by weight.

5. A composition as in claim 1 wherein said organic acid or anhydride is selected from the group consisting of phthalic and terephthalic acids and anhydrides and trimellitic anhydride.

6. A composition as in claim 5 wherein said organic anhydride is trimellitic anhydride.

7. A composition as in claim 1 wherein said polyhydric alcohol is selected from the group consisting of pentaerythritol, dipentaerythritol, hexahydric alcohols and polyethylene glycols.

8. A composition as in claim 7 wherein said polyhydric alcohol is a polyethylene glycol.

9. A filler composition for highly filled polystyrene which comprises, in parts by weight, 25 to 80 parts of talc and 0.5 to 5 parts of a mixture of polyester-forming reactants comprising a polybasic organic acid or anhydride and a polyhydric alcohol, each having a melting point in the range of 250° to 550° F, said organic acid or anhydride and said alcohol each being present in said mixture in an amount of from 1 to 2 parts by weight per 3 parts by weight of said mixture.

10. A composition as in claim 9 wherein said organic acid or anhydride and said alcohol are present in approximately equal weights in said mixture.

11. A composition as in claim 9 wherein said organic anhydride in trimellitic anhydride.

12. A composition as in claim 9 wherein said alcohol is a polyethylene glycol.

* * * * *